(12) United States Patent
Paster et al.

(10) Patent No.: US 12,300,434 B2
(45) Date of Patent: *May 13, 2025

(54) HIGH YIELD STORAGE MATERIALS

(71) Applicant: PolyJoule, Inc., Billerica, MA (US)

(72) Inventors: Eli Paster, Boston, MA (US); Taizoon Canteenwala, Lowell, MA (US); Eliza Spear, Somerville, MA (US); Zhengguo Zhu, Chelmsford, MA (US); Timothy Manning Swager, Newton, MA (US)

(73) Assignee: PolyJoule, Inc., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,557

(22) Filed: Mar. 7, 2024

(65) Prior Publication Data

US 2024/0395474 A1 Nov. 28, 2024

Related U.S. Application Data

(63) Continuation of application No. 17/289,683, filed as application No. PCT/US2019/058307 on Oct. 28, 2019, now Pat. No. 11,955,280.

(Continued)

(51) Int. Cl.
*H01G 11/48* (2013.01)
*C08G 61/12* (2006.01)
(Continued)

(52) U.S. Cl.
CPC .......... *H01G 11/48* (2013.01); *C08G 61/126* (2013.01); *H01G 11/28* (2013.01); *H01G 11/32* (2013.01); *H01G 11/52* (2013.01); *H01G 11/62* (2013.01); *C08G 2261/11* (2013.01); *C08G 2261/122* (2013.01); *C08G 2261/312* (2013.01); *C08G 2261/3223* (2013.01); *C08G 2261/43* (2013.01); *C08G 2261/514* (2013.01)

(58) Field of Classification Search
None
See application file for complete search history.

(56) References Cited

U.S. PATENT DOCUMENTS 3,706,601 A 12/1972 Strier et al.
4,272,471 A 6/1981 Walker
(Continued)

FOREIGN PATENT DOCUMENTS

CN 101486839 A 7/2009
CN 104380410 A 2/2015
(Continued)

OTHER PUBLICATIONS

Translation of CN 105531298 (Year: 2017).*
(Continued)

*Primary Examiner* — Dion R. Ferguson
(74) *Attorney, Agent, or Firm* — Wolf, Greenfield & Sacks, P.C.

(57) ABSTRACT

Strong and flexible electrically conductive polymers comprising hydrogen-bondable moieties are described herein. The electrically conductive polymers are formed by polymerizing an electron donating aromatic monomer in the presence of an oxidant, solvent, and/or hydrogen-bondable additive, such as an additive comprising a hydroxyl group.

20 Claims, 2 Drawing Sheets

Related U.S. Application Data (60) Provisional application No. 62/752,264, filed on Oct. 29, 2018.

(51) Int. Cl.
*H01G 11/28* (2013.01)
*H01G 11/32* (2013.01)
*H01G 11/52* (2013.01)
*H01G 11/62* (2013.01)

(56) References Cited

U.S. PATENT DOCUMENTS

| | | |
|---|---|---|
| 5,693,433 A | 12/1997 | Zhukovskiy et al. |
| 5,986,046 A | 11/1999 | Nishiyama et al. |
| 9,831,044 B2 | 11/2017 | Hunter et al. |
| 10,756,348 B2 | 8/2020 | Schubert et al. |
| 11,955,280 B2 * | 4/2024 | Paster .............. H01G 11/48 |
| 2001/0036573 A1 | 11/2001 | Jen et al. |
| 2004/0021131 A1 | 2/2004 | Blanchet-Fincher et al. |
| 2009/0154059 A1 | 6/2009 | Wessling et al. |
| 2013/0271090 A1 | 10/2013 | Hunter et al. |
| 2016/0218375 A1 | 7/2016 | Chiang et al. |
| 2016/0293938 A1 | 10/2016 | Takeuchi et al. |
| 2018/0174764 A1 | 6/2018 | Hunter et al. |
| 2021/0407740 A1 | 12/2021 | Paster et al. |

FOREIGN PATENT DOCUMENTS

| | | | |
|---|---|---|---|
| CN | 105531298 B | * 11/2017 | .............. B05D 5/12 |
| CN | 110224140 A | 9/2019 | |
| EP | 1130667 A1 | 9/2001 | |
| JP | H10-308327 A | 11/1998 | |
| JP | 2015-518278 A | 6/2015 | |
| JP | 2019-533044 A | 11/2019 | |
| KR | 10-2015-0042147 A | 4/2015 | |
| RU | 2762028 C2 | 12/2021 | |
| WO | WO 2012/144477 A1 | 10/2012 | |
| WO | WO 2013/154724 A1 | 10/2013 | |
| WO | WO 2017/032582 A1 | 3/2017 | |
| WO | WO 2020/092213 A1 | 5/2020 | |

OTHER PUBLICATIONS

Partial European Search Report mailed Aug. 1, 2022, for Application No. 19878488.6.
Extended European Search Report mailed Nov. 2, 2022, for Application No. 198784888.6.
International Search Report and Written Opinion mailed Jan. 15, 2020, for Application No. PCT/US2019/058307.
International Preliminary Report on Patentability mailed May 14, 2021, for Application No. PCT/US2019/058307.
Ghosh et al., Conducting polymer hydrogels as 3D electrodes: applications for supercapacitors. Adv Mater. 1999; 11(14): 1214-8.
Soudan et al., Synthesis, chemical polymerization and electrochemical properties of low band Gap conducting polymers for use in supercapacitors. J Mater Chem. 2001; 11:773-82.
Wu et al., Phenol assisted deaggregation of polyaniline chains: simple route to high quality polyaniline film. J Phys Chem B. Jun. 5, 2008;112(22):6772-8. doi: 10.1021/jp800932y. Epub May 8, 2008.

* cited by examiner

HIGH YIELD STORAGE MATERIALS

RELATED APPLICATIONS

This application is a continuation of U.S. application Ser. No. 17/289,683, filed Apr. 28, 2021, which is a national stage filing under 35 U.S.C. § 371 of international application number PCT/US2019/058307, filed Oct. 28, 2019, which claims priority under 35 U.S.C. § 119 (e) to U.S. provisional patent application, U.S. Ser. No. 62/752,264, filed Oct. 29, 2018, the entire contents of each which are incorporated herein by reference in their entirety.

FIELD OF THE INVENTION

The present invention generally relates to high yield storage materials and related methods.

BACKGROUND

The process by which solid particles are fabricated into continuous substrate films varies, depending not only on the particle size and/or distribution of sizes, but also the mechanical, thermal, chemical, electrical, and physical properties of the solid particles. In instances where solid particles are soluble in either an aqueous or non-aqueous solution, they can be mixed with or without other binding materials, condensed, and formed into a continuous substrate film, such as an electrode and/or current collector. The method of forming non-soluble materials into a continuous substrate film is generally more limited to either compaction, adhesive processing, or extreme repeated processing, and such methods generally restrict the resultant chemical, mechanical, or electrical properties of the material. Accordingly, improved compositions and methods of fabrication are needed.

SUMMARY OF THE INVENTION

The present invention generally relates to high yield storage materials and related methods. The subject matter of the present invention involves, in some cases, interrelated products, alternative solutions to a particular problem, and/or a plurality of different uses of one or more systems and/or articles.

In some embodiments, a device is described, wherein the device comprises a current collector and a first electrode comprising a polymer film comprising an electrically conductive polymer having a hydrogen-bondable moiety, wherein the polymer film is in electrochemical communication with the current collector, and wherein the polymer film has an energy density of greater than or equal to 50 KJ/kg.

In certain embodiments, a composition is described, wherein the composition comprises an electrically conductive polymer comprising a hydrogen-bondable moiety, wherein the electrically conductive polymer has an energy density of greater than or equal to 50 kJ/kg, and the composition is a high viscosity slurry, a semi-solid composed of slurry and granular particles, or granular particles.

In some embodiments, a method for producing an electrically conductive polymer is described, the method comprising mixing an oxidant and a solvent to form a solid oxidant-solvent complex, and polymerizing an electron donating aromatic monomer in the presence of the solid oxidant-solvent complex to form the electrically conductive polymer, wherein the oxidant comprises iron or an iron derivative and the solvent is selected from the group consisting of acetonitrile, carbonate, benzene, water, dichloromethane, chloroform, mixtures thereof, and derivatives thereof.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Compositions and methods for high yield storage materials are generally provided. For example, in some embodiments, strong and flexible electrically conductive polymers comprising hydrogen-bondable moieties are generally described.

The electrically conductive polymers may be formed by polymerizing electron donating aromatic monomers in the presence of an oxidant, solvent, and/or hydrogen-bondable additive, such as an additive comprising a hydroxyl group. The resulting electrically conductive polymers may, in some aspects, have the same or improved electrochemical properties (e.g., conductivity) and/or are stronger and more flexible as compared to traditional materials, including electrically conductive polymers that do not contain the hydrogen-bondable additive. Without wishing to be bound by theory, the improved properties of the compositions described herein may be due, at least in part, to the incorporation of the hydrogen-bondable moieties into the polymer chain, which, for example, may increase adhesion between polymers. As a result, in some cases, the strong and flexible electrically conductive polymers described herein may be suitable as layers (e.g., films for use as electrodes) in energy storage devices.

Carbon-based electrodes are often synthesized through the processing of activated carbon powders, which conventionally includes mixing of activated carbon powders with a binder, solvent, and/or other additives. By contrast, conducting polymer electrodes are generally more difficult to form into films. One method of forming conducting polymer films is to follow the fabrication protocol that is similar to what is done for carbon-based electrodes, wherein the powder form of the conducting polymer is mixed with a binder and a solvent that is later evaporated. The resulting material is usually processed through pressing, heating, and/or drying.

In some cases, desirable conducting polymers are insoluble, and the powder-to-film conversion often may result in poor film quality, e.g., where the films are mechanically fragile. For instance, unsubstituted conducting polymers, such as polythiophene, are usually separated as a powder when prepared through chemical oxidative polymerization. Films prepared from powders such as polythiophene may be brittle and weak due to the lack of adhesive forces between particles.

Figure 1:
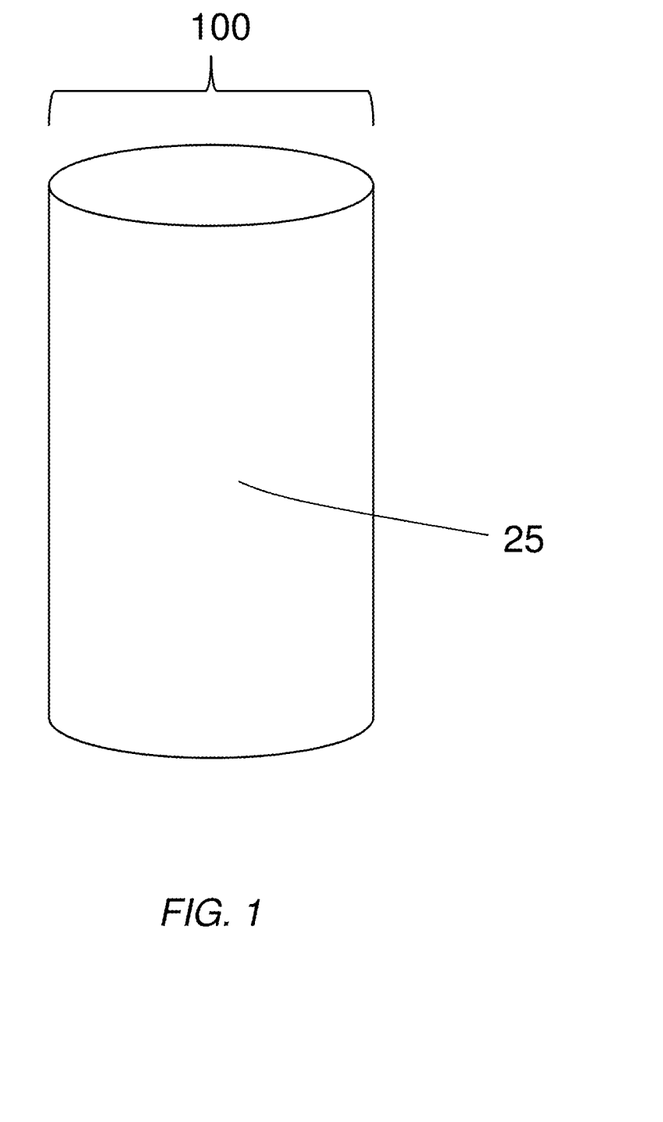
FIG. 1 shows, in some embodiments, a schematic representation of a polymer film disposed as an electrode.

The Inventors have discovered that the incorporation of hydrogen-bondable moieties during the polymerization process of conductive monomers can result in the enhancement of the manufacturability, chemical properties, and/or the mechanical properties of the resultant conducting polymers. For example, and without wishing to be bound by theory, when a small percentage of hydrogen-bondable moieties (e.g., hydroxyl groups) are introduced into the polymer chains, the adhesion between polymer particles may be greatly improved, allowing for the formation of stronger and more flexible polymer films, that can be used, for example, as electrodes in energy storage devices. FIG. 1, shows a schematic representation of an exemplary polymer film disposed as an electrode. As shown in FIG. 1, polymer film 25 is disposed as electrode 100. The resulting polymers that have been polymerized in the presence of at least a small molar percentage of hydrogen-bondable moieties, for example, may in some embodiments have similar electrochemical properties as compared to their non-hydroxylated derivatives, but form much stronger and more flexible polymer films. In certain embodiments, the presence of at least a small molar percentage of hydrogen-bondable moieties may improve electrochemical properties as compared to derivatives without the hydrogen-bondable moieties. The incorporation of the hydrogen-bondable moieties into the polymer chain, in some embodiments, increases the bonding interaction between individual monomers, and/or between particles overall. In some embodiments, the polymer films may have remarkable electrochemical properties and may be suitable for use as electrodes in energy storage devices, such as capacitors.

Certain compositions described herein are related to polymer films comprising electrically conductive polymers. According to certain embodiments, the electrically conductive polymer may comprise electron donating aromatic monomers. For example, in certain embodiments, the electrically conductive polymer may comprise electron donating aromatic monomers in a repeating chain. In some embodiments, at least a portion of the electron donating aromatic monomers are chlorinated. For example, in certain embodiments, the chlorine content of the chlorinated electron donating aromatic monomers is between the range of greater than or equal to 0.001 wt. % and less than or equal to 20 wt. %. According to certain embodiments, the electrically conductive polymer may comprise pyrrole, thiophene, aniline, benzene, and/or derivatives thereof (e.g., chlorinated derivatives).

According to certain embodiments, the electrically conductive polymer comprises a hydrogen-bondable moiety. The term "hydrogen-bond", as used herein, is given its ordinary meaning in the art and generally refers to a partially electrostatic attraction between a hydrogen (H) atom and a more electronegative atom (e.g., such as nitrogen (N), oxygen (O), fluorine (F), and/or another atom adjacent that H atom that bears a lone pair of electrons). The term "hydrogen-bondable", as used herein, is given its ordinary meaning in the art and generally refers to a moiety (e.g., a functional group, a portion of a molecule) which comprises a group capable of forming a hydrogen-bond with another atom.

In certain embodiments, the electrically conductive polymer may comprise a hydrogen-bondable moiety upon polymerization of an electron donating aromatic monomer and a hydrogen-bondable aromatic additive. Methods related to the synthesis (e.g., polymerization) of the electrically conductive polymer are described in more detail, below.

In some embodiments, the hydrogen-bondable aromatic additive may comprise a hydroxyl group. For example, in certain embodiments, the hydrogen-bondable aromatic additive may comprise phenolic compounds such as phenol, thiophenol, catechol, o-cresol, m-cresol, p-cresol, 2,4-di-tert-butylphenol, bisphenol A, 2,2'-biphenol, 4-pentadecyl phenol, 2-ethoxyphenol, 2-acetamidophenol, 4-hydroxydiphenylamine, 4-phenyl phenol, gallic acid, tannic acid, 1-napthol, 2-napthol, poly (4-vinylphenol), and/or mixtures thereof.

Certain embodiments are related to methods of synthesizing an electrically conductive polymer. The electrically conductive polymer may be synthesized by any of a variety of suitable methods. For example, in some embodiments, the method comprises polymerizing an electron donating aromatic monomer in the presence of an oxidant, a solvent, and a hydrogen-bondable aromatic additive to form the electrically conductive polymer.

Alternatively, in some embodiments, the method comprises first mixing an oxidant and a solvent to form a solid oxidant-solvent complex. According to some such embodiments, the method then comprises polymerizing an electron donating aromatic monomer in the presence of the solid oxidant-solvent complex to form the electrically conductive polymer. In some embodiments, the electrically conductive polymer comprises a hydrogen-bondable moiety.

According to some embodiments, the polymerizing step occurs at any of a variety of suitable temperatures. For example, in certain embodiments, the polymerizing step may occur at a temperature of less than or equal to 200° C., less than or equal to 150° C., less than or equal to 120° C., less than or equal to 100° C., less than or equal to 50° C., less than or equal to 20° C., less than or equal to 10° C., less than or equal to 1° C., less than or equal to 0° C., less than or equal to $-10°$ C., less than or equal to $-20°$ C., or less than or equal to $-30°$ C. In some embodiments, the polymerizing step may occur at a temperature of greater than or equal to $-40°$ C., greater than or equal to $-30°$ C., greater than or equal to $-20°$ C., greater than or equal to $-10°$ C., greater than or equal to 0° C., greater than or equal to 10° C., greater than or equal to 20° C., greater than or equal to 50° C., greater than or equal to 100° C., greater than or equal to 120° C., or greater than or equal to 150° C. Combinations of the above recited ranges are also possible (e.g., the polymerizing step may occur at a temperature of less than or equal to 100° C. and greater than or equal to 0° C., the polymerizing step may occur at a temperature of less than or equal to 150° C. and greater than or equal to $-40°$ C.).

According to certain embodiments, the molar ratio of the electron donating aromatic monomers to the hydrogen-bondable aromatic additive in the electrically conductive polymer may be any of a variety of suitable amounts. For example, according to certain embodiment, the molar ratio of the electron donating aromatic monomers to the hydrogen-bondable aromatic additive in the electrically conductive polymer may be greater than or equal to 100:1. In some embodiments, the molar ratio of the electron donating aromatic monomers to the hydrogen-bondable aromatic additive in the electrically conductive polymer may be greater than or equal to 100:2, greater than or equal to 100:5, greater than or equal to 100:10, greater than or equal to 100:15, greater than or equal to 100:20, greater than or equal to 100:25, greater than or equal to 100:30, greater than or equal to 100:50, greater than or equal to 100:75. In certain embodiments, the molar ratio of the electron donating aromatic monomers to the hydrogen-bondable aromatic additive in the electrically conductive polymer may be less than or equal to 100:100, less than or equal to 100:75, less than or equal to 100:50, less than or equal to 100:30, less than or equal to 100:25, less than or equal to 100:20, less than or equal to 100:15, less than or equal to 100:10, less than or equal to 100:5, or less than or equal to 100:2.

According to certain embodiments, the molar ratio of the electron donating aromatic monomers to the hydrogen-bondable aromatic additive in the electrically conductive polymer may be greater than or equal to 1:100. In some embodiments, the molar ratio of the electron donating aromatic monomers to the hydrogen-bondable aromatic additive in the electrically conductive polymer may be greater than or equal to 2:100, greater than or equal to 5:100, greater than or equal to 10:100, greater than or equal to 15:100, greater than or equal to 20:100, greater than or equal to 25:100, greater than or equal to 30:100, greater than or equal to 50:100, greater than or equal to 75:100. In certain embodiments, the molar ratio of the electron donating aromatic monomers to the hydrogen-bondable aromatic additive in the electrically conductive polymer may be less than or equal to 100:100, less than or equal to 75:100, less than or equal to 50:100, less than or equal to 30:100, less than or equal to 25:100, less than or equal to 20:100, less than or equal to 15:100, less than or equal to 10:100, less than or equal to 5:100, or less than or equal to 2:100.

In some embodiments, the molar ratio of the electron donating aromatic monomers to the hydrogen-bondable aromatic additive may be between 100:1 and 1:100. The molar ratio of the electron donating aromatic monomers to the hydrogen-bondable aromatic additive may be calculated by elemental analysis, multinuclear nuclear magnetic resonance, and/or other spectroscopic methods.

In some embodiments, the methods of synthesis described herein may provide the electrically conductive polymer in any of a variety of suitable yields. For example, in certain embodiments, the yield of the electrically conductive polymer may be greater than or equal to 40%. According to some embodiments, the yield of the electrically conductive polymer may be greater than or equal to 50%, greater than or equal to 60%, greater than or equal to 70%, greater than or equal to 80%, or greater than or equal to 90%. In certain embodiments, the yield of the electrically conductive polymer may be less than or equal to 100%, less than or equal to 90%, less than or equal to 80%, less than or equal to 70%, less than or equal to 60%, or less than or equal to 50%. Combinations of the above recited ranges are also possible (e.g., the yield of the electrically conductive polymer may be greater than or equal to 40% and less than or equal to 100%, the yield of the electrically conductive polymer may be greater than or equal to 50% and less than or equal to 80%). The yield of the electrically conductive polymer may be determined by the amount of precursor materials used during synthesis (e.g., the electron donating aromatic monomers and/or the hydrogen-bondable aromatic additive).

In certain embodiments, the oxidant is an oxidative coupling reagent that couples the electron donating aromatic monomer with the hydrogen-bondable aromatic additive. For example, without wishing to be bound by theory, the hydrogen-bondable aromatic additive may couple with the electron donating aromatic monomer through C—C and/or C—O bond formation. According to certain embodiments, the oxidant comprises iron or an iron derivative. For example, in certain embodiments, the oxidant is an iron (III) salt. In some embodiments, the oxidant is iron (III) chloride, iron (III) chloride hydrate, and/or iron (III) p-toluene sulfonate hexahydrate. According to certain embodiments, the oxidant may be added to the reaction mixture in excess, with respect to the electron-donating monomers. For example, in certain embodiments, between at least 1 and less than or equal to 25 equivalents of oxidant are added to the reaction mixture, with respect to the electron-donating monomers. In some other embodiments, less than 1 equivalent of oxidant is added to the reaction mixture, with respect to the electron-donating monomers. For example, in some aspects, between at least 0.005 and less than 1 equivalent of oxidant is added to the reaction mixture, with respect to the electron-donating monomers.

In certain embodiments, the solvent used during synthesis of the electrically conductive polymer may be acetonitrile, carbonate, aromatics (e.g., benzene, mesitylene, pyridine, toluene, xylene, and the like), water, dichloromethane, chloroform, mixtures thereof, and/or derivatives thereof (e.g., chlorinated derivatives, fluorinated derivatives, and the like). In some embodiments, the electrically conductive polymer comprises a trace amount of solvent (e.g., after forming the polymer, after drying of the polymer).

In a non-limiting embodiment, the composition comprising electrically conductive polymers may by synthesized by polymerizing thiophene in the presence of small percentages (e.g., 1 mol. % to 10 mol. %, with respect to thiophene) of a phenol and 0.005-25 (e.g., 2-10) equivalents (with respect to thiophene) of iron (III) chloride. In an alternate, non-limiting embodiment, thiophene may be polymerized in the presence of small percentages (e.g., 1 mol. % to 10 mol. % with respect to thiophene) of catechol and 2-10 equivalents (with respect to thiophene) of iron (III) chloride.

In some embodiments, after synthesizing the electrically conductive polymer, the electrically conductive polymer is in the form of a high viscosity slurry, a semi-solid composed of slurry and granular particles, or granular particles (e.g., prior to being disposed as an electrode in an energy storage device such as a capacitor). In certain embodiments, the electrically conductive polymer has any of a variety of suitable viscosities. The viscosity of the electrically conductive polymer can be measured by using a viscometer, for example.

In some embodiments, following the synthesis of the electrically conductive polymer, the electrically conductive polymer may be post-processed into a film. For example, in certain embodiments, the electrically conductive polymer comprising granular particles may be rolled and/or pressed into a film. In certain embodiments, the electrically conductive polymer comprising a slurry or semi-solid composed of slurry and granular particles may be coated onto a conductive substrate (e.g., aluminum foil) and dried.

According to certain embodiments, the electrically conductive polymer may be post-processed into a film for use as an electrode in an energy storage device (e.g., a capacitor). In some embodiments, the electrode may be in electrochemical communication with a current collector. In some embodiments, the electrically conductive polymer film may comprise an electrically conductive polymer having a hydrogen-bondable aromatic moiety. In addition to the electrically conductive polymer having a hydrogen-bondable aromatic moiety, the electrically conductive polymer film may comprise one or more oxidants (e.g., trace amounts), and/or one or more solvents (e.g., trace amounts), in some cases. In some aspects, the electrically conductive polymer film may comprise crystalline polymers (e.g., a solid state structure). According to some embodiments, the electrically conductive polymer film may comprise amorphous polymers. In certain embodiments, the polymer layer may be in electrochemical communication with an electrode (e.g., a second electrode) and/or a current collector.

According to some embodiments, the polymer film may be disposed as an electrode in an energy storage device (e.g. a capacitor) in electrochemical communication with a current collector. For example, in some embodiments, polymer layer 25 is disposed as electrode 100, as shown in FIG. 1. Electrode 100, in some embodiments, may be in electrochemical communication with a current collector. In certain embodiments, the polymer layer may be substantially evenly dispersed throughout the electrode. For instance, in some cases, the electrode may be fabricated by mixing an electrode active material (e.g., activated carbon powders) with the electroactive polymer.

In certain embodiments, the polymer film comprising the electrically conductive polymers described herein are stronger and more flexible than a theoretical polymer film comprising electron donating aromatic monomers (e.g., thiophene) without a hydrogen-bondable aromatic additive. For example, according to some embodiments, the polymer film comprising the electrically conductive polymers may be relatively stiff and/or have a relatively high Young's elastic modulus, which is explained in further detail below.

According to certain embodiments, the polymer film comprising the electrically conductive polymers may have a relatively high Young's elastic modulus. For example, in some embodiments, the composition may have a Young's elastic modulus of greater than or equal to 1 GPa, greater than or equal to 5 GPa, greater than or equal to 10 GPa, greater than or equal to 20 GPa, greater than or equal to 30 GPa, greater than or equal to 40 GPa, or greater than or equal to 50 GPa. In certain embodiments, the composition may have a Young's elastic modulus of less than or equal to 60 GPa, less than or equal to 50 GPa, less than or equal to 40 GPa, less than or equal to 30 GPa, less than or equal to 20 GPa, less than or equal to 10 GPa, or less than or equal to 5 GPa. Combinations of the above recited ranges are also possible (e.g., the composition may have a Young's elastic modulus of greater than or equal to 1 GPa and less than or equal to 60 GPa, the composition may have a Young's elastic modulus of greater than or equal to 20 GPa and less than or equal to 40 GPa).

In some embodiments, energy storage devices are described. According to certain embodiments, a device may comprise a current collector and an electrode comprising a polymer film comprising an electrically conductive polymer having a hydrogen-bondable moiety. In certain embodiments, the polymer film may be in electrochemical communication with the current collector. In certain embodiments, the device may be an electrochemical double-layer capacitor, also known as a supercapacitor, a supercondenser, a faradaic capacitor, and/or an ultracapacitor. Typically, the device may store energy (e.g., electric energy) in an electric field that is established by charge separation at an interface between two electroactive materials (e.g., electrode and electrolyte). A general embodiment of an energy storage device can include a first electrode, a second electrode in electrochemical communication with the first electrode, and a separator material arranged between the first and second electrodes. According to certain embodiments, the second electrode is substantially separated from the first electrode. In some embodiments, the second electrode and/or the first electrode may comprise a conductive carbon material. In some embodiments, the first electrode is a cathode and the second electrode is an anode. In some other embodiments, the first electrode is an anode and the second electrode is a cathode. In certain aspects, the device includes an electrolyte or other mobile phase that can dissociate into anions and cations in contact with both electrodes. The components of the device may be assembled such that the electrolyte is arranged between the first and second electrodes. In some embodiments, the components of the device may be assembled such that the electrolyte is distributed throughout the bulk of the electrodes and the separator material.

Figure 2:
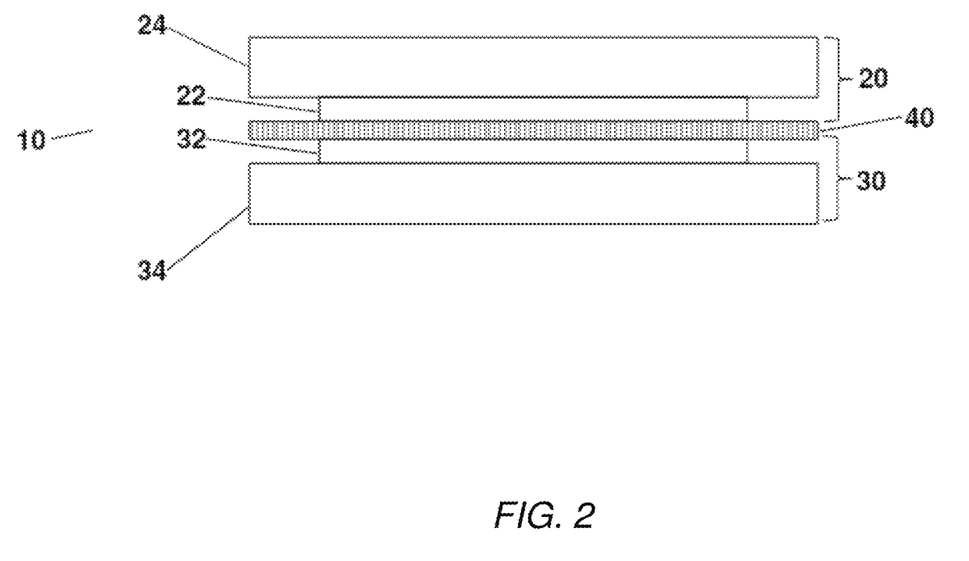
FIG. 2 shows a schematic representation of an energy storage device, according to certain embodiments.

FIG. 2 shows an illustrative embodiment of a device as described herein. It should be understood that while certain layers depicted in the figures are disposed directly on one another, other intermediate layers may also be present between the depicted layers in certain embodiments. Accordingly, as used herein, when a layer is referred to as being "disposed on", "deposited on", or "on" another layer, it can either be directly disposed on, deposited onto, or on the layer, or an intervening layer may also be present. In contrast, a layer that is "directly disposed on", "in contact with", "directly deposited on", or "directly on" another layer indicates that no intervening layer is present. In the embodiment shown in FIG. 2, device 10 (e.g., energy storage device) includes first electrode 20, which comprises first electrically conductive material 22 in contact with substrate 24. In certain embodiments, first electrically conductive material 22 and substrate 24 may be the same composition (e.g., electrically conductive polymers). Second electrode 30, in some embodiments, comprises second electrically conductive material 32 in contact with substrate 34. Second electrically conductive material 32 and substrate 34 may be the same composition (e.g., electrically conductive polymers). According to certain embodiments, first electrode 20 and second electrode 30 may be arranged in the device such that they are in electrochemical communication with each other (e.g., via a separator material). Separator material 40 can be placed adjacent (e.g., directly adjacent) to electrode 20 and second electrode 30. As used herein, when a first component is referred to as being "adjacent" another component, it can be directly adjacent to (e.g., in contact with) the first component, or one or more intervening components also may be present. A component that is "directly adjacent" another component means that no intervening component(s) is present. Second electrically conductive material 32 may be in contact with a surface of separator material 40 that is opposed to the surface of separator material 40 that is in contact with first electrically conductive material 22. An electrolyte may be arranged between first electrode 20 and second electrode 30 (e.g., via the separator material), such that the electrolyte is in contact with both first electrode 20 and second electrode 30. It should be understood that there are other embodiments in which the orientation of the components is varied. In some embodiments, one or more of the device components can be formed as thin films. For example, according to certain embodiments, first electrode 20 comprising substrate 24 and first electrically conductive material 22 may be a thin film and/or second electrode 30 comprising substrate 34 and second electrically conductive material 32 may be a thin film.

In some embodiments, a device may be charged and/or discharged during normal operation. According to certain embodiments, the energy storage device may have to be charged and/or discharged in order to store energy (e.g., as energy density of the device). Therefore, in certain embodiments, the device can be charged and/or discharged at a potential window between 0 V and 6.5 V. According to some embodiments, the potential window may change depending on the composition of components in the energy storage device.

According to some embodiments, the electrically conductive polymers described herein may have substantially the same and/or improved electrochemical properties (e.g., conductivity) as a theoretical polymer of the electron donating aromatic monomer (e.g., polythiophene) without a hydrogen-bondable aromatic additive. A film of the electrically conductive polymers may be disposed into a device (e.g., a capacitor) as an electrode (e.g., in electrical communication with a current collector), such that the polymer has any of a variety suitable energy densities. According to certain embodiments, the electrically conductive polymer film has an energy density of greater than or equal to 50 KJ/kg. In some aspects, for example, the electrically conductive polymer film may have an energy density of between 50 KJ/kg and 2000 KJ/kg. In certain embodiments, the electrically conductive polymer film may have an energy density of greater than or equal to 50 KJ/kg, greater than or equal to 100 KJ/kg, greater than or equal to 200 KJ/kg, greater than or equal to 300 KJ/kg, greater than or equal to 400 KJ/kg, greater than or equal to 500 KJ/kg, greater than or equal to 600 KJ/kg, greater than or equal to 700 KJ/kg, greater than or equal to 800 KJ/kg, greater than or equal to 900 KJ/kg, greater than or equal to 1000 KJ/kg, greater than or equal to 1100 KJ/kg, greater than or equal to 1200 KJ/kg, greater than or equal to 1300 KJ/kg, greater than or equal to 1400 KJ/kg, greater than or equal to 1500 KJ/kg, greater than or equal to 1600 KJ/kg, greater than or equal to 1700 KJ/kg, greater than or equal to 1800 KJ/kg, or greater than or equal to 1900 KJ/kg. In some embodiments, the electrically conductive polymer film may have an energy density of less than or equal to 2000 KJ/kg, less than or equal to 1900 kJ/kg, less than or equal to 1800 KJ/kg, less than or equal to 1700 KJ/kg, less than or equal to 1600 KJ/kg, less than or equal to 1500 KJ/kg, less than or equal to 1400 KJ/kg, less than or equal to 1300 KJ/kg, less than or equal to 1200 KJ/kg, less than or equal to 1000 KJ/mol, less than or equal to 900 KJ/kg, less than or equal to 800 KJ/kg, less than or equal to 700 KJ/kg, less than or equal to 600 KJ/kg, less than or equal to 500 KJ/kg, less than or equal to 400 KJ/kg, less than or equal to 300 KJ/kg, less than or equal to 200 KJ/kg, or less than or equal to 100 KJ/mol. Combinations of the above recited ranges are also possible (e.g., the device comprising the electrically conductive polymer has an energy density greater than or equal to 50 KJ/kg and less than or equal to 1000 KJ/kg, the device comprising the electrically conductive polymer film has an energy density greater than or equal to 500 KJ/kg and less than or equal to 2000 KJ/kg). According to some embodiments, the energy density of the device comprising the electrically conductive polymer film may be the gravimetric energy density of the device. The energy density of the device comprising the electrically conductive polymer film may be calculated, in some embodiments, based on the total energy stored divided by the total mass of the polymer film.

According to certain embodiments, a device may comprise a first electrode and a second electrode separated (e.g., by one or more layers) from the first electrode. Electrodes described herein, including electrodes in electrochemical communication with another electrode, may include additional components that may improve the performance, stability, and/or other properties of the electrode. For example, the electrode may include an additive conductive material (e.g., a conductive powder), and may further include a material that binds the powder particles together. Examples of other additives or modifiers include metal salts, metal oxides, polydimethylsiloxane, polystyrene, polypropylene, silicone oil, mineral oil, paraffin, a cellulosic polymer, polybutadiene, polyneopropene, natural rubber, polyimide, polytetrafluoroethylene, styrene butadiene rubber, polyvinylidene difluoride, or other polymers.

The device may further include an electrolyte arranged to be in electrochemical communication with the first and second electrodes (e.g., the first electrode and second electrode are in contact with a common electrolyte). The electrolyte can be any of a variety of materials capable of transporting either positively or negatively charged ions or both between two electrodes and should be chemically compatible with the electrodes. In some cases, the electrolyte is selected to be capable of supporting high charge stabilization.

In some embodiments the electrolyte is a liquid electrolyte. In one set of embodiments, the electrolyte is an ionic liquid. In certain embodiments, for example, the electrolyte is the ionic liquid 1-ethyl-3-methylimidazolium tetrafluoroborate. Other examples of electrolytes include ethylene carbonate solutions, dimethyl carbonate solutions, dimethyl carbonate, ethyl methyl carbonate, diethyl carbonate, ethylene carbonate, propylene carbonate, acetonitrile, and/or propylene carbonate solutions, which include at least one salt having the formula, $[(R)_4N^+][X^-]$, wherein X is $(PF_6)^-$, $(BF_4)^-$, $(SO_3R^a)^-$, $(R^aSO_2—N—SO_2R^a)^-$, or $(CF_3)_2CHO)^-$, wherein R is alkyl and $R^a$ is alkyl, aryl, fluorinated alkyl, or fluorinated aryl. In certain embodiments, the liquid electrolyte comprises N-ethyl-N-(2-methoxyethyl)-N,N-dimethylammonium tetrafluoroborate.

According to certain embodiments, the electrolyte may comprise a separator. The separator material may be any material capable of physically separating the first and second electrodes, while also allowing fluids and/or charged species (e.g., electrolyte) to travel from one electrode to another. The separator material may also be selected to be chemically inert to other components of the device, so as to not interfere with device performance (e.g., charge/discharge of the device). In some cases, the separator material is or comprises paper. In some cases, the separator material is or comprises a polymer. For example, the polymer may include polypropylene, polyethylene, cellulose, a polyarylether, or a fluoropolymer.

In one embodiment, the first and second electrodes may be placed on opposite surfaces of a substantially planar separator material wherein the thickness of the separator material determines the distance between the electrodes.

As used herein, the term "alkyl" refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. In some embodiments, a straight chain or branched chain alkyl may have 30 or fewer carbon atoms in its backbone, and, in some cases, 20 or fewer. In some embodiments, a straight chain or branched chain alkyl has 12 or fewer carbon atoms in its backbone (e.g., C1-C12 for straight chain, C3-C12 for branched chain), or, in some cases, 6 or fewer, or 4 or fewer. Likewise, some cycloalkyls have from 3-10 carbon atoms in their ring structure, or have 5, 6 or 7 carbons in the ring structure. Examples of alkyl groups include, but are not limited to, methyl, ethyl, propyl, isopropyl, cyclopropyl, butyl, isobutyl, tert-butyl, cyclobutyl, hexyl, cyclohexyl, and the like.

The term "heteroalkyl" refers to an alkyl group as described herein in which one or more carbon atoms is replaced by a heteroatom. Suitable heteroatoms include oxygen, sulfur, nitrogen, phosphorus, and the like. Examples of heteroalkyl groups include, but are not limited to, alkoxy, amino, thioester, and the like.

The term "aryl" refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls. The aryl group may be optionally substituted, as described herein. "Carbocyclic aryl groups" refer to aryl groups wherein the ring atoms on the aromatic ring are carbon atoms. Carbocyclic aryl groups include monocyclic carbocyclic aryl groups and polycyclic or fused compounds (e.g., two or more adjacent ring atoms are common to two adjoining rings) such as naphthyl groups.

The term "heteroaryl" refers to aryl groups comprising at least one heteroatom as a ring atom.

The term "heterocyclyl" refers to refer to cyclic groups containing at least one heteroatom as a ring atom, in some cases, 1 to 3 heteroatoms as ring atoms, with the remainder of the ring atoms being carbon atoms. Suitable heteroatoms include oxygen, sulfur, nitrogen, phosphorus, and the like. In some cases, the heterocycle may be 3-to 10-membered ring structures, or in some cases 3-to 7-membered rings, whose ring structures include one to four heteroatoms. The term "heterocycle" may include heteroaryl groups (e.g., aromatic heterocycles), saturated heterocycles (e.g., cycloheteroalkyl) groups, or combinations thereof. The heterocycle may be a saturated molecule, or may comprise one or more double bonds. In some case, the heterocycle is an aromatic heterocycle, such as pyrrole, pyridine, and the like. In some cases, the heterocycle may be attached to, or fused to, additional rings to form a polycyclic group. In some cases, the heterocycle may be part of a macrocycle. The heterocycle may also be fused to a spirocyclic group. In some cases, the heterocycle may be attached to a compound via a nitrogen or a carbon atom in the ring.

Heterocycles include, for example, thiophene, benzothiophene, thianthrene, furan, tetrahydrofuran, pyran, isobenzofuran, chromene, xanthene, phenoxathiin, pyrrole, dihydropyrrole, pyrrolidine, imidazole, pyrazole, pyrazine, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, triazole, tetrazole, oxazole, isoxazole, thiazole, isothiazole, phenanthridine, acridine, pyrimidine, phenanthroline, phenazine, phenarsazine, phenothiazine, furazan, phenoxazine, pyrrolidine, oxolane, thiolane, oxazole, oxazine, piperidine, homopiperidine (hexamnethyleneimine), piperazine (e.g., N-methyl piperazine), morpholine, lactones, lactams such as azetidinones and pyrrolidinones, sultams, sultones, other saturated and/or unsaturated derivatives thereof, and the like. The heterocyclic ring can be optionally substituted at one or more positions with such substituents as described herein. In some cases, the heterocycle may be bonded to a compound via a heteroatom ring atom (e.g., nitrogen).

In some cases, the heterocycle may be bonded to a compound via a carbon ring atom. In some cases, the heterocycle is pyridine, imidazole, pyrazine, pyrimidine, pyridazine, acridine, acridin-9-amine, bipyridine, naphthyridine, quinoline, benzoquinoline, benzoisoquinoline, phenanthridine-1,9-diamine, or the like.

As used herein, the term "halo" designates —F, —Cl, —Br, or —I.

The terms "carboxyl group," "carbonyl group," and "acyl group" are recognized in the art and can include such moieties as can be represented by the general formula:

wherein W is H, OH, O-alkyl, O-alkenyl, or a salt thereof. Where W is O-alkyl, the formula represents an "ester." Where W is OH, the formula represents a "carboxylic acid." The term "carboxylate" refers to an anionic carboxyl group. In general, where the oxygen atom of the above formula is replaced by sulfur, the formula represents a "thiocarbonyl" group. Where W is a S-alkyl, the formula represents a "thioester." Where W is SH, the formula represents a "thiocarboxylic acid." On the other hand, where W is alkyl or aryl, the above formula represents a "ketone" group (e.g., alkylcarbonyl, arylcarbonyl, etc.). Where W is hydrogen, the above formula represents an "aldehyde" group.

Any of the above groups may be optionally substituted. As used herein, the term "substituted" is contemplated to include all permissible substituents of organic compounds, "permissible" being in the context of the chemical rules of valence known to those of ordinary skill in the art. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF3, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, cyano, alkoxyalkyl, perhaloalkyl, arylalkyloxyalkyl, and the like.

EXAMPLES AND EMBODIMENTS

Example 1

The following example describes the synthesis of an electrically conductive polymer. Thiophene was added to a cooled solution (~0° C.) of anhydrous iron (III) chloride in acetonitrile. The resulting dark colored solution was stirred at ~0° C. for 15 minutes, during which time dark greenish solids separated out. These polymer solids were collected by filtration and washed with water until the filtrate was pale colored. The partially de-doped solids were washed with methanol, followed by an acetone wash to remove oligomers. The dark brown polymer appeared silky and was dried in vacuo at 50° C., providing a yield of 45-99%.

Example 2

The following example describes the synthesis of an alternate electrically conductive polymer. A mixture of thiophene and phenol was added to a cooled solution (~0° C.) of anhydrous iron (III) chloride in acetonitrile. The resulting dark colored solution was stirred at ~0° C. for 15 minutes, during which time dark greenish solids separated out. These polymer solids were collected by filtration and washed with water until the filtrate was pale colored. The partially de-doped solids were washed with methanol, followed by an acetone wash to remove oligomers and homo-polymers of phenol. The dark brown polymer appeared silky and was dried in vacuo at 50° C., providing a yield of 50-80%.

Example 3

The following example describes the preparation of free-standing films comprising polymer, activated carbon, conductive additive, and/or some combination of these components described as the "active material". Active material was mixed with polytetrafluoroethylene and water. The resulting dough was rolled into a 200 micron thick film on a rolling mill, with further water and isopropyl alcohol added dropwise as needed to adjust film flexibility and consistency. The film was then dried under vacuum and cut into desirable shapes and sizes to be used as electrodes in supercapacitor devices.

Example 4

The following example describes the preparation of slurry-coated films comprising polymer, activated carbon, conductive additive, or some combination of these components described as the "active material". Active material was mixed with polyacrylic acid and water. The resulting mixture (slurry) was then coated via doctor blade onto aluminum foil and dried under vacuum. The coating and aluminum foil substrate were cut into desirable shapes and sizes to be used as a combined electrode (e.g., coating) and current collector (e.g., aluminum foil) in supercapacitor devices.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. A method for producing an electrically conductive polymer, comprising:
    mixing an oxidant and a solvent to form a solid oxidant-solvent complex; and
    polymerizing an electron donating aromatic monomer in the presence of the solid oxidant-solvent complex to form the electrically conductive polymer, wherein the polymerizing occurs at a temperature less than or equal to 200° C.,
    wherein the electron donating aromatic monomer is selected from the group consisting of pyrrole, thiophene, aniline, benzene, mixtures thereof, and derivatives thereof.

2. The method of claim 1, wherein the electron donating aromatic monomer is aniline.

3. The method of claim 1, wherein the oxidant comprises iron or an iron derivative.

4. The method of claim 1, wherein the oxidant is an iron (III) salt.

5. The method of claim 1, wherein the oxidant is selected from the group consisting of iron (III) chloride, iron (III) chloride hydrate, and iron (III) p-toluene sulfonate hexahydrate.

6. The method of claim 1, wherein the electrically conductive polymer comprises a trace amount of the oxidant.

7. The method of claim 1, wherein the solvent is selected from the group consisting of acetonitrile, carbonate, benzene, water, dichloromethane, chloroform, mixtures thereof, and derivatives thereof.

8. The method of claim 1, wherein the electrically conductive polymer comprises a trace amount of the solvent.

9. The method of claim 1, wherein the polymerizing occurs at a temperature greater than or equal to −40° C.

10. The method of claim 1, wherein the electrically conductive polymer is a high viscosity slurry, a semi-solid composed of slurry and granular particles, or granular particles.

11. The method of claim 1, further comprising post-processing the electrically conductive polymer into a film.

12. A device, comprising:
    a current collector; and
    a first electrode comprising a polymer film in electrochemical communication with the current collector, wherein the polymer film comprises an electrically conductive polymer comprising:
    electron donating aromatic monomers selected from the group consisting of pyrrole, thiophene, aniline, benzene, mixtures thereof, and derivatives thereof;
    a trace amount of an oxidant; and
    a trace amount of a solvent.

13. The device of claim 12, wherein the electron donating aromatic monomers are aniline.

14. The device of claim 12, wherein the polymer film has an energy density greater than or equal to 50 KJ/kg and less than or equal to 2000 KJ/kg.

15. The device of claim 12, further comprising an electrolyte.

16. The device of claim 15, wherein the electrolyte comprises N-ethyl-N-(2-methoxyethyl)-N,N-dimethylammonium tetrafluoroborate, 1-ethyl-3-methylimidazolium tetrafluoroborate, ethylene carbonate solutions, dimethyl carbonate solutions, propylene carbonate solutions, dimethyl carbonate, ethyl methyl carbonate, diethyl carbonate, ethylene carbonate, propylene carbonate, and/or acetonitrile.

17. The device of claim 15, wherein the first electrode and a second electrode are in contact with the electrolyte.

18. The device of claim 12, further comprising a separator.

19. A composition, comprising:
    an electrically conductive polymer comprising:
    electron donating aromatic monomers selected from the group consisting of pyrrole, thiophene, aniline, benzene, mixtures thereof, and derivatives thereof;
    a trace amount of an oxidant; and
    a trace amount of a solvent,
    wherein the composition is a high viscosity slurry, a semi-solid composed of slurry and granular particles, or granular particles.

20. The composition of claim 19, wherein the electron donating aromatic monomers are aniline.

* * * * *

UNITED STATES PATENT AND TRADEMARK OFFICE
CERTIFICATE OF CORRECTION

PATENT NO. : 12,300,434 B2
APPLICATION NO. : 18/598557
DATED : May 13, 2025
INVENTOR(S) : Eli Paster et al.

It is certified that error appears in the above-identified patent and that said Letters Patent is hereby corrected as shown below:

On the Title Page

In item (63), Related U.S. Application Data, the text:
"Continuation of application No. 17/289,683, filed as
application No. PCT/US2019/058307on Oct.28, 2019, now Pat. No.11,955,280.
(Continued)"
Should be replaced with:
-- Continuation of application No. 17/289,683, filed April 28, 2021, filed as
application No. PCT/US2019/058307 on Oct. 28, 2019, now Pat. No. 11,955,280.
(Continued) --.

In the Claims

In Claim 14, at Column 16, Lines 30 and 31:
"14. The device of claim 12, wherein the polymer film has an energy density greater than or equal to 50 KJ/kg and less than or equal to 2000 KJ/kg."
Should read:
-- The device of claim 12, wherein the polymer film has an energy density greater than or equal to 50 kJ/kg and less than or equal to 2000 kJ/kg. --.

Signed and Sealed this
Fourth Day of November, 2025

John A. Squires
*Director of the United States Patent and Trademark Office*